(12) United States Patent
Matsushita et al.

(10) Patent No.: US 6,590,694 B2
(45) Date of Patent: Jul. 8, 2003

(54) FARADAY ROTATOR

(75) Inventors: Takeshi Matsushita, Iwata-gun (JP); Mitsuteru Inoue, Okazaki (JP); Hideki Kato, Iwata-gun (JP); Akio Takayama, Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/112,711

(22) Filed: Apr. 2, 2002

(65) Prior Publication Data

US 2002/0149831 A1 Oct. 17, 2002

(30) Foreign Application Priority Data

Apr. 11, 2001 (JP) ........................................ 2001-112826

(51) Int. Cl.[7] .............................. G02F 1/09; G02F 1/00; G02B 27/28
(52) U.S. Cl. ........................ 359/280; 359/281; 359/484; 359/324
(58) Field of Search ................................. 359/280, 281, 359/282, 283, 484, 495, 496, 497, 256, 324; 372/703, 33, 26, 37, 94; 324/244.1; 250/227.14

(56) References Cited

U.S. PATENT DOCUMENTS

| | | | | |
|---|---|---|---|---|
| 4,905,252 A | * | 2/1990 | Goldberg et al. | ............. 372/94 |
| 5,076,675 A | * | 12/1991 | Kusaka et al. | ............. 359/484 |
| 5,463,316 A | * | 10/1995 | Shirai et al. | ............. 324/244.1 |
| 5,479,290 A | * | 12/1995 | Tanno et al. | ................. 359/324 |
| 5,493,222 A | * | 2/1996 | Shirai et al. | ............. 324/244.1 |
| 6,018,411 A | * | 1/2000 | Fukushima et al. | ......... 359/283 |
| 6,421,176 B1 | * | 7/2002 | Takahashi et al. | ........... 359/484 |

FOREIGN PATENT DOCUMENTS

| | | |
|---|---|---|
| JP | A 2000-274936 | 10/2000 |
| JP | A 2000-338973 | 12/2000 |
| JP | A 2001-100925 | 4/2001 |
| JP | A 2001-110635 | 4/2001 |
| JP | A 2002-49006 | 2/2002 |

* cited by examiner

*Primary Examiner*—Evelyn Lester
*Assistant Examiner*—Jack Dinh
(74) *Attorney, Agent, or Firm*—Oliff & Berridge, PLC

(57) ABSTRACT

A Faraday rotator is provided which obtains excellent optical characteristics with a small number of layers. In the Faraday rotator, a metal reflective film is formed on a substrate, then a first periodic dielectric multilayer film made of silicon dioxide $SiO_2$ and tantalum pentaoxide $Ta_2O_5$, a magneto-optical thin film, and a second periodic dielectric multilayer film made of tantalum pentaoxide $Ta_2O_5$ and silicon dioxide $SiO_2$ are formed sequentially. The number of layers of the first periodic dielectric multilayer film is larger than that of the second periodic dielectric multilayer film. Incident light from a polarizer passes through the periodic dielectric multilayer films, is reflected at the metal reflective film, returns through the periodic dielectric multilayer films, and passes through an analyzer to exit out.

4 Claims, 6 Drawing Sheets

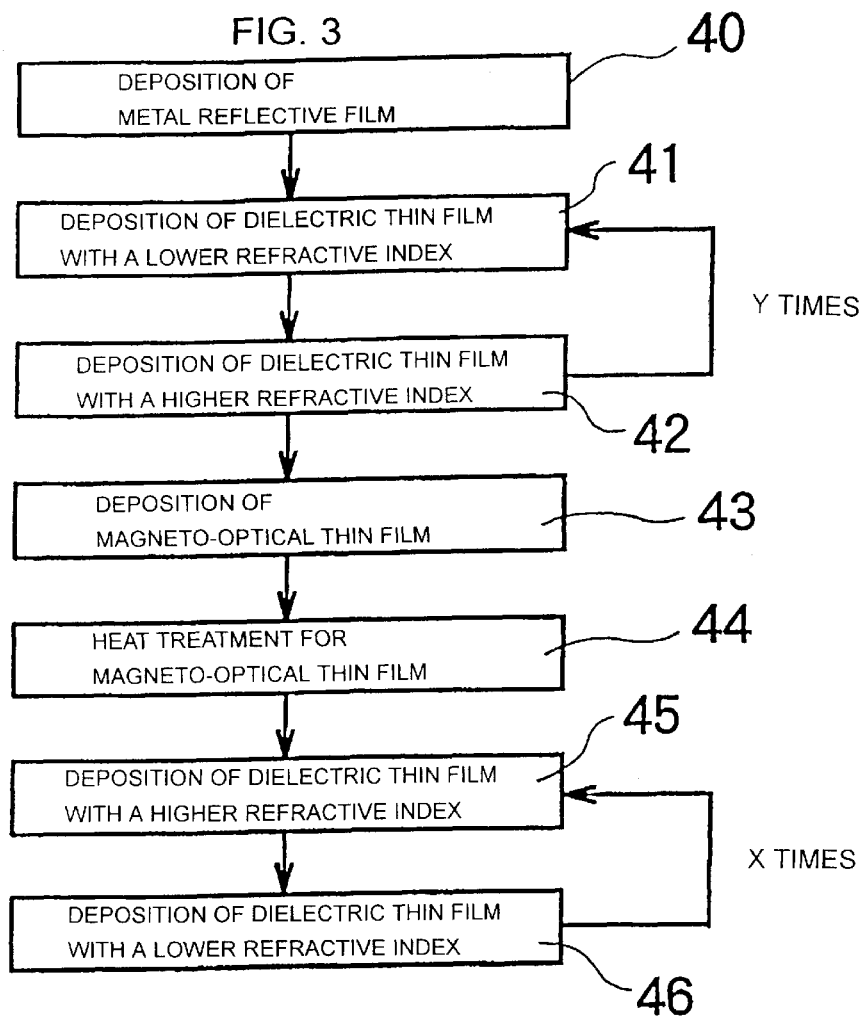
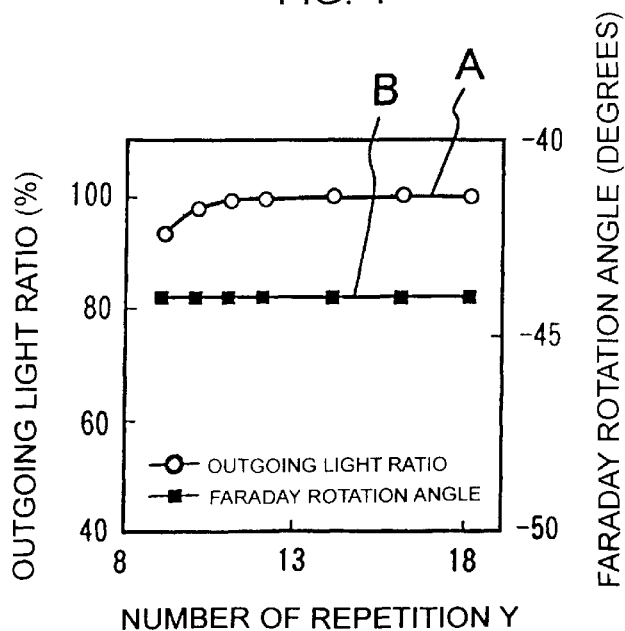

FARADAY ROTATOR

BACKGROUND OF THE INVENTION

1. Field of the Invention

The present invention relates to a Faraday rotator which constitutes an optical isolator or an optical circulator for use in an optical fiber communication system, an optical recording system, an optical measurement system or the like.

2. Description of the Related Art

In an optical fiber communication system having a semiconductor laser as a light source, in particular, an optical system based on a high speed digital transmission or an analog direct modulation mode, if reflected light from optical connector junctions, optical circuit components and the like which are used in an optical fiber circuit returns to the semiconductor laser or an optical amplifier, it becomes difficult to maintain high quality transmission due to degradation of frequency characteristics or generation of noises. An optical isolator is used for the purpose of removing the reflected light.

As shown in FIG. 8, a conventional optical isolator is constituted by a polarizer 6 and an analyzer 5 both of which transmit only light of a specific plane of polarization, a Faraday rotator 4 composed of a light transmissible substrate 9 and a laminate film 3 formed thereon and adapted to rotate the plane of polarization of light by 46 degrees, and a permanent magnet (not shown) for applying a magnetic field to the Faraday rotator. Among the constituent members of the optical isolator, the Faraday rotator 4 has a primary influence on the performance of the optical isolator. It is important for the Faraday rotator 4 to have a small element length required for rotating the plane of polarization by 45 degrees and a large light transmittance.

Up to now, the Faraday rotator has been made of an yttrium iron garnet (YIG) bulk single crystal (about 2 mm in thickness), or of a bismuth-substituted rare earth iron garnet (BiYIG) thick film single crystal (several hundred $\mu$m in thickness) in which part of yttrium is substituted with bismuth having a large magneto-optical performance index. Recently, the BiYIG thick film single crystal is employed in many cases because it is advantageous in downsizing the optical isolator.

Further, in recent years, the magneto-optical component (Faraday rotator) made of one-dimensional magneto-photonic crystal which causes the enhancement of the magneto-optical effect due to the localization of light is proposed. Though the above-mentioned magneto-optical component is of polycrystal with a thickness of several $\mu$m, a large Faraday rotation angle can be obtained.

With regard to the one-dimensional magneto-photonic crystal, various structures are proposed. Among them, up to now, the Fabry-Perot resonator structure, in which a magneto-optical thin film is sandwiched between two periodic dielectric multilayer films, obtains a large Faraday rotation angle with the smallest number of layers.

While a $(Ta_2O_5/SiO_2)$ system is generally employed as the dielectric for constituting a dielectric multilayer film serving as a reflecting mirror of the Fabry-Perot resonator, a $(Si/SiO_2)$ system has also been proposed which can obtain a large Faraday rotation angle with a smaller number of layers than the $(Ta_2O_5/SiO_2)$ system (for example, Japanese Patent Laid-open No. P2002-49006 A). The film thickness of each dielectric needs to be designed such that its optical length (optical path length×refractive index) is equal to $\lambda/4$ ($\lambda$: a wavelength of light). In addition, it is general that the optical length of an irregular layer (defect layer) composed of a magneto-optical thin film which causes localization of light is set equal to $k\lambda/2$ ($\lambda$: a positive integer).

However, the Faraday rotator with the Fabry-Perot resonator structure has a trade-off relationship between a Faraday rotation angle and a light transmittance, and it has been found that the transmittance is reduced to approximately 50%, if the Faraday rotation angle is increased up to 45 degrees (or −45 degrees), which is the requirement of the optical isolator. 50% of light, which is not transmitted, is reflected in the multilayer film and returns to a light source. This is extremely adverse because the optical isolator is used for the purpose of blocking return light. Further, a reduction in the light emission amount means that a transmittable distance of light is shortened, which makes it difficult to construct a light transmission system.

The present inventors have found that the structure in which two Fabry-Perot resonators sandwich a dielectric thin film having a low refractive index and having an optical length of $\lambda/4+m\lambda/2$ (m: 0 or a positive integer) (hereinafter referred to as D.H.W. (double half wave)) is effective in improving the transmittance. The details are disclosed in Japanese Patent Application No. 2000-274936 that was filed on Sep. 11, 2000 and has not been open to the public. With a film structure of $(Ta_2O_5/SiO_2)^8/BiYIG/(SiO_2/Ta_2O_5/SiO_2)^8/BiYIG/(SiO_2/Ta_2O_5)^8$, a Faraday rotation angle of 45 degrees, a transmittance of 99.9% or more and a reflectance of 0.1% or less can be obtained, which raises no problem in practical use.

Further, the present inventors have found that the transmittance and the Faraday rotation angle are compatible with each other also when the dielectric thin film and the magneto-optical thin film have a structure of $[L/(H/L)^{X-1}/H/M/H/(H/L)^{X-1}]^N/L$ (hereinafter referred to as S.B.P (square band pass) structure), where L indicates a dielectric thin film with a low refractive index, H indicates a dielectric thin film with a high refractive index, M indicates a magneto-optical thin film, X is the number of repetition of a bilayer (H/L), and N indicates the number of repetition of a base periodic structure. The details are described in Japanese Patent Application No. 2000-338973 that was filed on Nov. 7, 2000 and has not been open to the public. In the above formula, when $L=SiO_2$, $H=Ta_2O_5$, $M=BiYIG$, $X=7$ and $N=3$, a transmittance of 100% and a Faraday rotation angle of 45 degrees are obtained.

It has been found that the transmittance and the Faraday rotation angle can be compatible with each other with the above-mentioned multilayer film structures. However, the structures have as many as 67 and 85 layers in total, respectively, including two and more magneto-optical thin films (BiYIG) which require heat treatment. Thus, a process of lamination is complicated, which puts a limitation on a reduction in manufacturing cost. Further, there is a problem that light returning to the light source is generated if the component is manufactured with an optical length deviating from a designed value.

Under the above-mentioned circumstances, the present inventors have proposed and examined a Faraday rotator with a reflection structure as shown in FIG. 9 (Japanese Patent Application No. 2001-100925 that was filed on Mar. 30, 2001 and has not been open to the public), in which a metal reflective film 2 is formed on a substrate 1, then a first periodic dielectric multilayer film 3p, a magneto-optical thin film 3m and a second periodic dielectric multilayer film 3p' that has the same number of bilayers as the first periodic dielectric multilayer film are formed on the metal reflective film 2, and in which light, which is made incident at a predetermined inclination angle with respect to a direction normal to the film on a side on which the metal reflective film 2 is not formed, is reflected at the metal reflective film 2. In the above-mentioned Faraday rotator with the reflection structure, a large Faraday rotation angle can be obtained with a small number of layers, and also light returning to the light source can be completely controlled. However, a problem emerged that incident light is somewhat absorbed by the metal reflective film, and thus, outgoing light ratio ((amount of light emitted from the Faraday rotator/amount of light made incident on the Faraday rotator)×100) % is reduced.

SUMMARY OF THE INVENTION

The present invention has been made in the light of the foregoing, and it is therefore an object of the present invention to provide a Faraday rotator of multilayer film type, which has a reflection structure that enables a drastic reduction in the number of layers and which can obtain a Faraday rotation angle without suffering absorption loss of light.

In order to achieve the above-mentioned object, according to the present invention, in a Faraday rotator with a reflection structure, two periodic dielectric multilayer films have a number of layer different from each other such that the number of layers of one periodic dielectric multilayer film that is in contact with a metal reflective film is larger than that of the other periodic dielectric multilayer film, whereby outgoing light ratio is improved to 100% while a Faraday rotation angle is kept unchanged.

According to a first aspect of the present invention, in a Faraday rotator, which comprises a first periodic dielectric multilayer film structured such that two kinds of dielectric thin films each having a refractive index different from the other are alternately laminated with regularity in each thickness thereof, a second periodic dielectric multilayer film structured such that two kinds of dielectric thin films each having a refractive index different from the other are alternately laminated with regularity in each thickness thereof, a magneto-optical thin film and a metal reflective film, and in which the magneto-optical thin film is sandwiched between the first periodic dielectric multilayer film and the second periodic dielectric multilayer film, the number of layers of the first periodic dielectric multilayer film is larger than that of the second periodic dielectric multilayer film, and the metal reflective film is formed on a side of the first periodic dielectric multilayer film opposite to a side in contact with the magneto-optical thin film.

According to a second aspect of the present invention, in the Faraday rotator of the first aspect, the first and second periodic dielectric multilayer films are each structured such that a dielectric thin film of the two kinds, which has a lower refractive index and constitutes the first or second periodic dielectric multilayer film, is in contact with the magneto-optical thin film, and a dielectric thin film with a low refractive index is provided between the metal reflective film and the first periodic dielectric multilayer film.

According to a third aspect of the present invention, in the Faraday rotator of the second aspect, an optical length of the dielectric thin film with a low refractive index is $\lambda/4$ ($\lambda$: a wavelength of light).

According to a fourth aspect of the present invention, in the Faraday rotator of the first aspect, at least one of the layers constituting the first or second periodic dielectric multilayer film is substituted by a magneto-optical thin film.

BRIEF DESCRIPTION OF THE DRAWINGS

The above and other objects as well as advantages of the present invention will become clear by the following description of the preferred embodiments of the present invention with reference to the accompanying drawings, wherein:

FIG. 3 is a flowchart explaining steps of manufacturing the Faraday rotator shown in FIG. 2;

FIG. 4 is a diagram showing an influence of the number of repetition Y on magneto-optical characteristics in the Faraday rotator according to the first embodiment;

DETAILED DESCRIPTION OF THE PREFERRED EMBODIMENTS

In the following embodiments, a bismuth-substituted rare earth iron garnet (BiYIG, refractive index: 2.36) is used for a magneto-optical thin film, tantalum pentaoxide $Ta_2O_5$ (refractive index: 2.14) is used for a dielectric thin film having a higher refractive index (hereinafter referred to as higher refractive dielectric thin film), silicon dioxide $SiO_2$ (refractive index: 1.42) is used for a dielectric thin film having a lower refractive index (hereinafter referred to as lower refractive dielectric thin film) which constitutes, together with the higher refractive dielectric thin film, a periodic dielectric multilayer film, and aluminum Al, (refractive index: 1.71, attenuation coefficient: 10.7) is used for a metal reflective film. Also, the wavelength of light $\lambda$ is set to 1300 nm.

Figure 1:
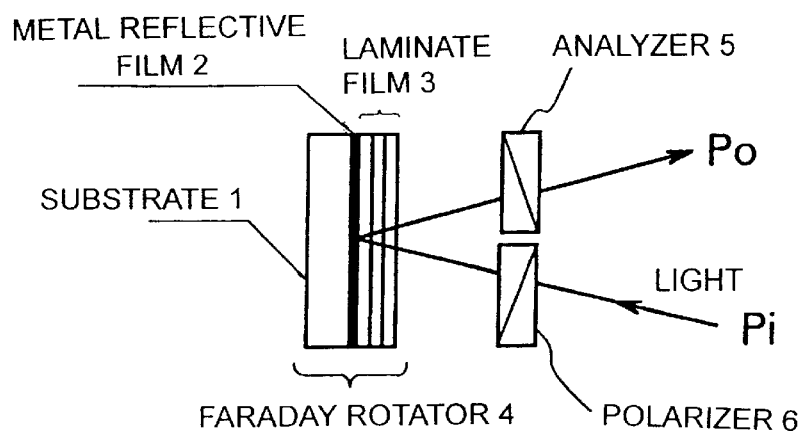
FIG. 1 is a diagram of a Faraday rotator of the present invention.

In FIG. 1, incident light Pi passes through a polarizer 6, is reflected and rotated by a predetermined Faraday rotation angle by a Faraday rotator 4, and passes through an analyzer 5 to exit out as outgoing light Po. The Faraday rotator 4 is structured such that a metal reflective film 2 and a laminate film 3 are sequentially formed on a substrate 1. Embodiments for the present invention in FIG. 1 are hereinafter described in detail with reference to FIGS. 2 to 7.

Figure 2:
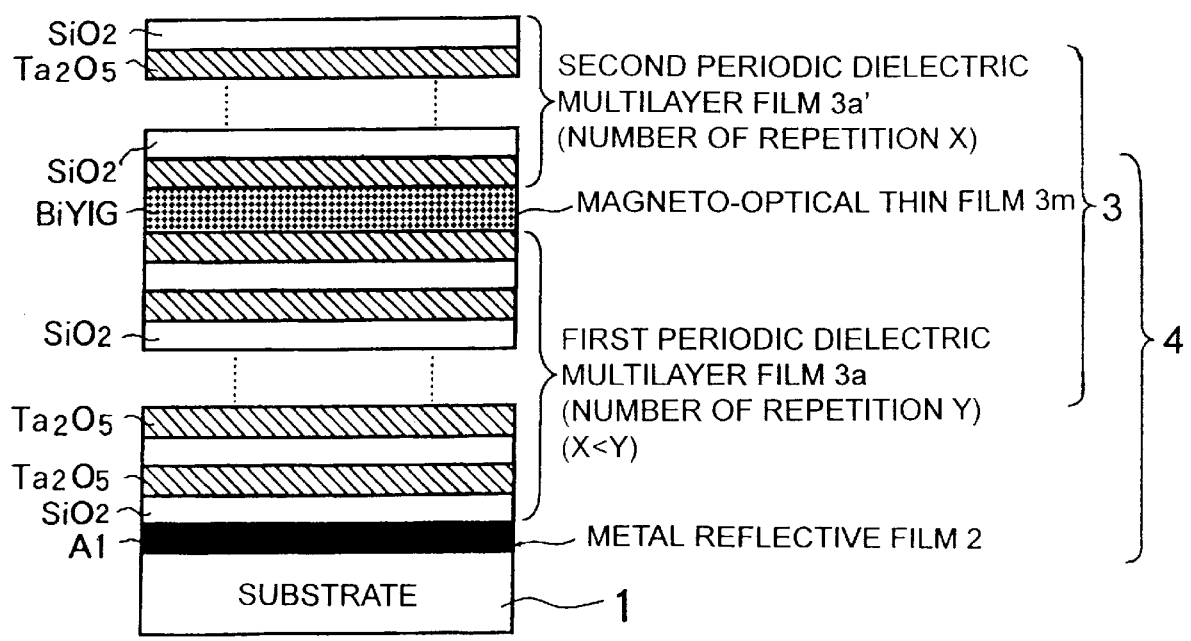
FIG. 2 is a diagram of a film structure for explaining a first embodiment of a Faraday rotator according to the present invention.

In a first embodiment of the present invention, as shown in FIG. 2, the film structure is $(SiO_2/Ta_2O_5)^X/BiYIG/(Ta_2O_5/SiO_2)^Y/Al$ (X<Y), where X and Y indicate numbers of bilayers ($SiO_2/Ta_2O_5$) and ($Ta_2O_5/SiO_2$), respectively, for the periodic dielectric multilayer films.

Specifically, aluminum (Al) as the metal reflective film 2 is formed on the substrate 1, and a first periodic dielectric multilayer film 3a composed of Y times of a bilayer consisting of silicon dioxide $SiO_2$ and tantalum pentaoxide $Ta_2O_5$ is formed on the metal reflective film 2, BiYIG as a magneto-optical thin film $3m$ is formed on the first periodic dielectric multilayer film $3a$, and further a second periodic dielectric multilayer film $3a'$ composed of X times of a bilayer consisting of tantalum pentaoxide $Ta_2O_5$ and silicon dioxide $SiO_2$ is formed on the magneto-optical thin film $3m$, and the number Y for the first periodic dielectric multilayer film $3a$ is larger than the number X for the second periodic dielectric multilayer film $3a'$.

Next, the process of manufacturing the Faraday rotator 4 in FIG. 2 will hereinafter be described with reference to FIG. 3. In FIG. 3, Al as the metal reflective film 2 is deposited on the substrate 1 so as to have a thickness of 100 nm or more (Step 40). Since light is to be reflected at the metal reflective film 2, the substrate 1 does not have to be transparent. Here, thin film forming techniques such as sputtering and vapor-deposition can be used.

Subsequently, a lower refractive dielectric thin film $SiO_2$ having an optical length of $\lambda/4$ is formed taking into consideration an incidence angle of light (Step 41), then a higher refractive dielectric thin film $Ta_2O_5$ having an optical length of $\lambda/4$ is formed (Step 42). The Steps 41 and 42 are alternately repeated Y times, respectively, whereby the first periodic dielectric multilayer film $(Ta_2O_5/SiO_2)^Y$ $3a$ is manufactured which serves as a reflecting mirror in a Fabry-Perot resonator.

Next, a bismuth-substituted rare earth iron garnet (BiYIG) as the magneto-optical thin film $3m$ having an optical length of $\lambda/2$ is formed on the first periodic dielectric multilayer film $(Ta_2O_5/SiO_2)^Y$ $3a$ (Step 43). Also here, the thin film manufacturing techniques used at the Step 40 can be used. However, it is important to control the composition of the magneto-optical thin film precisely in order to obtain a desired Faraday effect.

When the bismuth-substituted rare earth iron garnet (BiYIG) is used as the magneto-optical thin film $3m$, the film gets an amorphous structure at the Step 43 and hence does not have magnetism. For this reason, the magneto-optical thin film $3m$ is subjected to heat treatment at a high temperature to be crystallized (Step 44). The heat treatment may be carried out using a normal electric furnace depending on the combination of the dielectric thin films of the two kinds and the heat treatment temperatures Further, when a problem is caused by the turbulence of the multilayer film structure or the metal reflective film, which is generated due to the heat treatment, an infrared beam heating system may be employed which is devised by the present inventors and is disclosed in Japanese Patent Laid-open No P2001-110635A.

Next, the second periodic dielectric multilayer film $3a'$ that serves as another reflecting mirror is formed in an order reverse to the Steps 41 and 42 (Steps 45 and 46). Specifically, a higher refractive dielectric thin film $Ta_2O_5$ having an optical length of $\lambda/4$ is formed (Step 45), then a lower refractive dielectric thin film $SiO_2$ having an optical length of $\lambda/4$ is formed (Step 46).

The Steps 45 and 46 are alternately repeated X times, respectively, whereby the second periodic dielectric multilayer film $(SiO_2/Ta_2O_5)^X$ $3a'$ is manufactured. Thus, a laminate film formed on the metal reflective film formed on the substrate is fabricated. Then, the laminate film is cut to a predetermined size together with the metal reflective film and the substrate using a dicing machine or the like to complete the Faraday rotator 4.

In FIG. 4, the magneto-optical characteristics are shown which are obtained when the number Y is changed from 9 to 18 with the number X fixedly set to 9. The left vertical axis indicates an outgoing light ratio A, the right vertical axis indicates a Faraday rotation angle B, and the horizontal axis indicates the number Y When the number Y is set to 12 to 18, an outgoing light ratio A of 100% and a practical Faraday rotation angle B of about −45 degrees can be obtained. In this case, the total number of layers including BiYIG and Al is 44 to 56, respectively, which is equal to 51 to 66% of 85 layers in the S.B.P structure of the conventional example.

Figure 5:
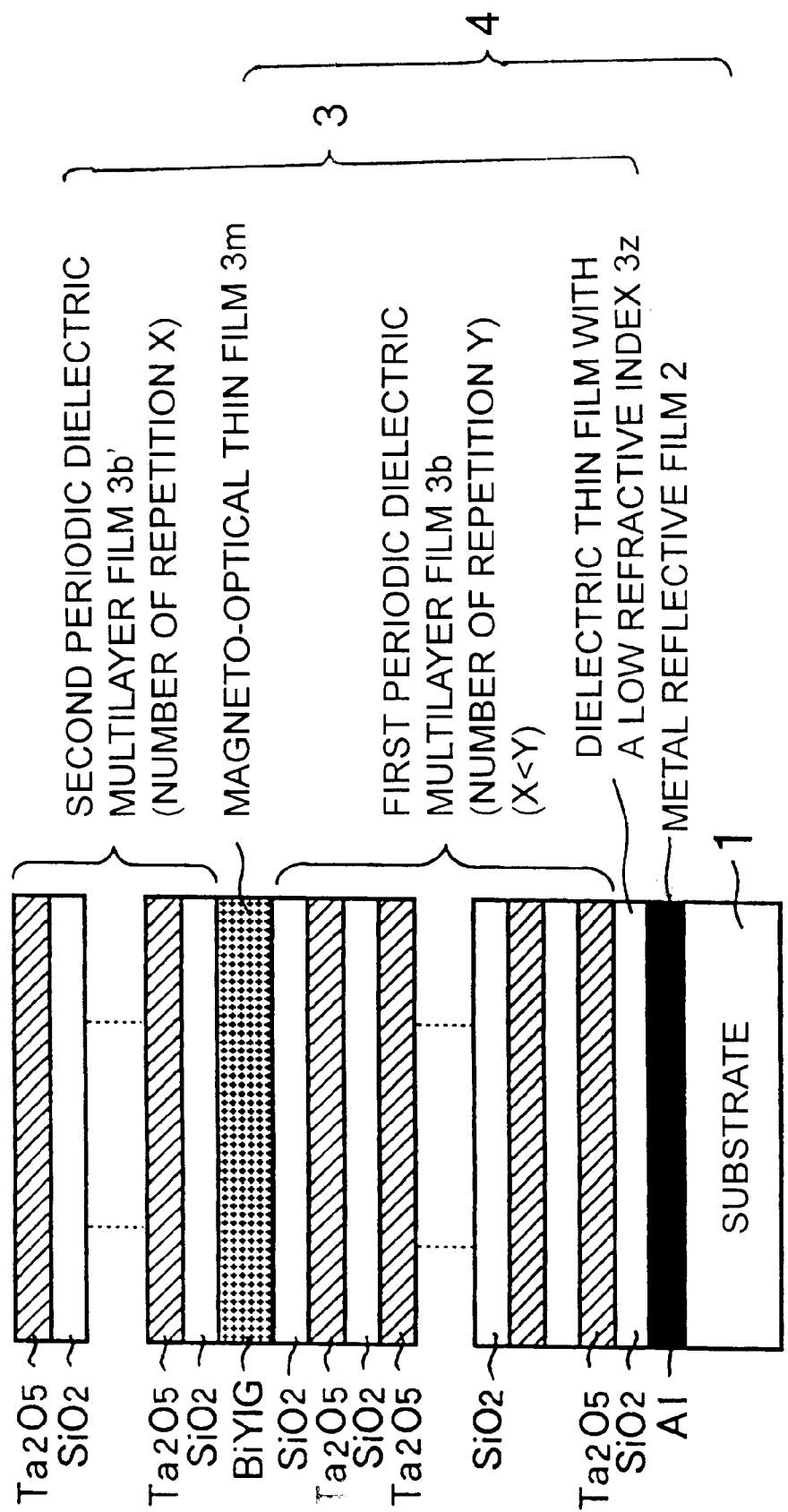
FIG. 5 is a diagram of a film structure for explaining a second embodiment of a Faraday rotator according to the present invention.

In a second embodiment of the present invention, the film structure is $(Ta_2O_5/SiO_2)^X/BiYIG/(SiO_2/Ta_2O_5)^Y/SiO_2/Al$ (X<Y) as shown in FIG. 5. Here, X and Y indicate the numbers of bilayers $(Ta_2O_5/SiO_2)$ and $(SiO_2/Ta_2O_5)$, respectively, for the second and first periodic dielectric multilayer films. The difference from the first embodiment shown in FIG. 2 is that a dielectric thin film with a low refractive index $3z$ having an optical length of $\lambda/4$ is provided between the metal reflective film 2 and a first periodic dielectric multilayer film $3b$ closer to the metal reflective film 2. Note that the dielectric thin film with a low refractive index $3z$ does not have to be identical with the lower refractive dielectric thin film which constitutes a periodic dielectric bilayer, but the workability is enhanced if identical.

The metal reflective film 2 is formed on the substrate 1, and the dielectric thin film $3z$ made of silicon dioxide $SiO_2$ and having an optical length of $\lambda/4$ is formed on the metal reflective film 2. Further, the first periodic dielectric multilayer film $3b$ composed of Y times of a bilayer consisting of tantalum pentaoxide $Ta_2O_5$ and silicon dioxide $SiO_2$ is formed on the dielectric thin film $3z$. Then, the magneto-optical thin film $3m$ is formed on the first periodic dielectric multilayer film $3b$, and a second periodic dielectric multilayer film $3b'$ composed of X times of a bilayer consisting of silicon dioxide $SiO_2$ and tantalum pentaoxide $Ta_2O_5$ is formed on the magneto-optical thin film $3m$. The number Y is set larger than the number X.

Figure 6:
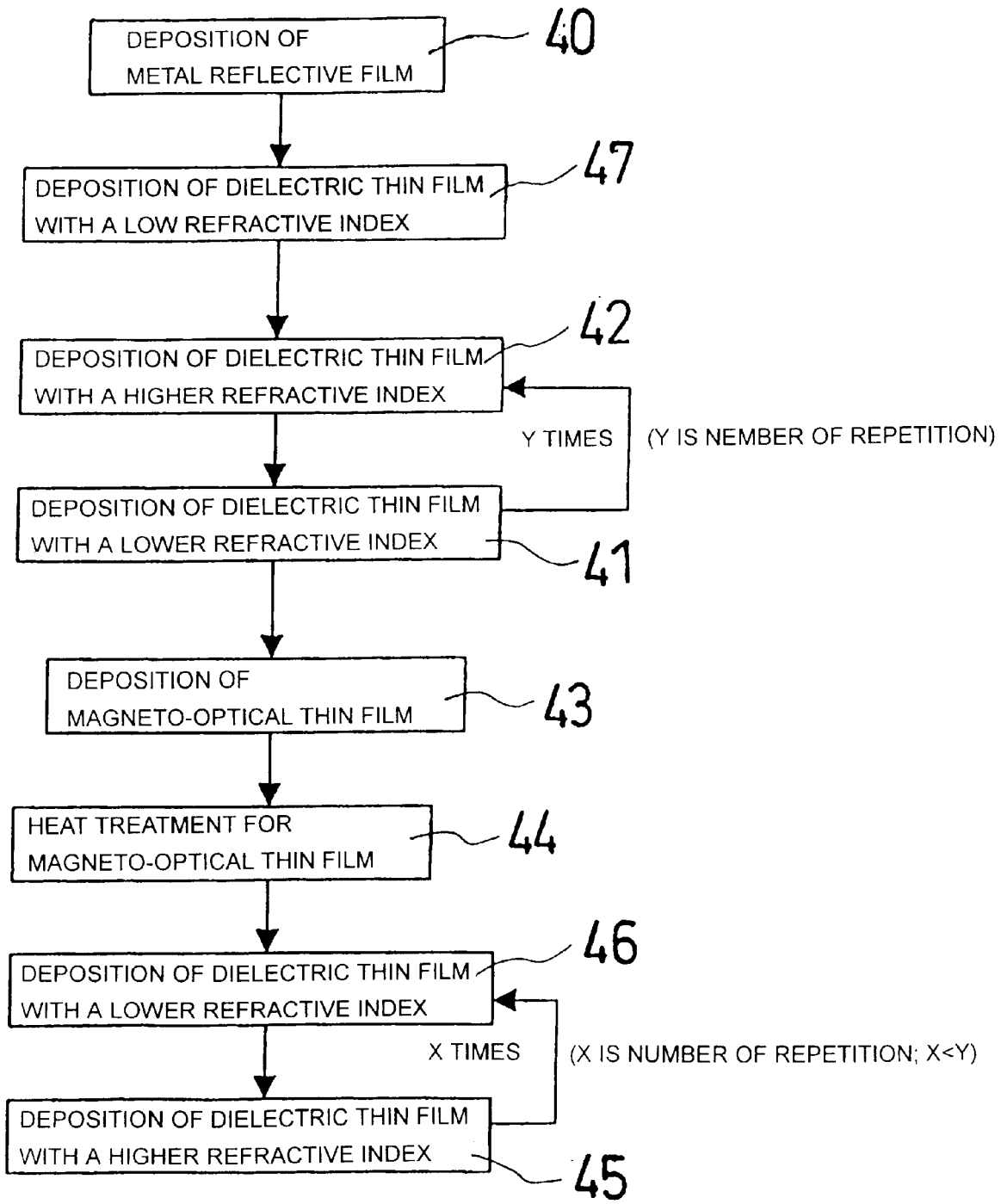
FIG. 6 is a flowchart explaining steps of manufacturing the Faraday rotator shown in FIG. 5.

The process of manufacturing the Faraday rotator 4 in the second embodiment shown in FIG. 5 is hereinafter described with reference to FIG. 6. In FIG. 6, aluminum (Al) as the metal reflective film 2 is formed on the substrate 180 as to have a thickness of 100 nm or more (Step 40). Since light is to be reflected at the metal reflective film 2, the substrate 1 does not have to be transparent. Here, thin film manufacturing techniques such as sputtering and vapor-deposition can be used.

Subsequently, $SiO_2$ as the dielectric thin film with a low refractive index $3z$ having an optical length of $\lambda/4$ is formed on the metal reflective film 2 taking into consideration an incidence angle of light (Step 47). Thereafter, a higher refractive dielectric thin film $Ta_2O_5$ having an optical length of $\lambda/4$ is formed (Step 42), then a lower refractive dielectric thin film $SiO_2$ having an optical length of $\lambda/4$ is formed (Step 41). The Steps 42 and 41 are alternately repeated Y times, respectively, whereby the first periodic dielectric multilayer film $(SiO_2/Ta_2O_5)^Y$ $3b$ is manufactured which serves as a reflecting mirror in a Fabry-Perot resonator.

Next, a bismuth-substituted rare earth iron garnet (BiYIG) as the magneto-optical thin film $3m$ having an optical length of $\lambda/2$ is formed on the first periodic dielectric multilayer film $3b$ (Step 43). Alto here, the thin film manufacturing techniques used at the Step 40 can be applied. However, it is important to control the composition of the magneto-optical thin film precisely in order to obtain a desired Faraday effect.

When the bismuth-substituted rare earth iron garnet (BiYIG) is used as the magneto-optical thin film $3m$, the film gets an amorphous structure at the Step 43 and hence does not have magnetism. For this reason, the magneto-optical thin film 3m is subjected to heat treatment at a high temperature to be crystallized (Step 44). The heat treatment may be carried out using a normal electric furnace depending on the combination of the dielectric thin films of the two kinds and the heat treatment temperature. Further, when a problem is caused by the turbulence of the multilayer film structure or the metal reflective film, which is generated due to the heat treatment, an infrared beam heating system may be employed which is devised by the present inventors and is disclosed in Japanese Patent Laid-open No. P2001-110635A.

Next, the second periodic dielectric multilayer film 3b' that serves as another reflecting mirror is formed in an order reverse to the Steps 42 and 41 (Steps 46 and 45). Specifically, a lower refractive dielectric thin film $SiO_2$ having an optical length of $\lambda/4$ is formed (Step 46), then a higher refractive dielectric thin film $Ta_2O$, having an optical length of $\lambda/4$ is formed (Step 45). The Steps 46 and are alternately repeated X times, respectively, whereby the second periodic dielectric multilayer film $(Ta_2O_5/SiO_2)^x$ 3b' is manufactured. Thus, a laminate film formed on the metal reflective film formed on the substrate is fabricated. Then, the laminate film is cut to a predetermined size together with the metal reflective film and the substrate using a dicing machine or the like to complete the Faraday rotator 4.

Figure 7:
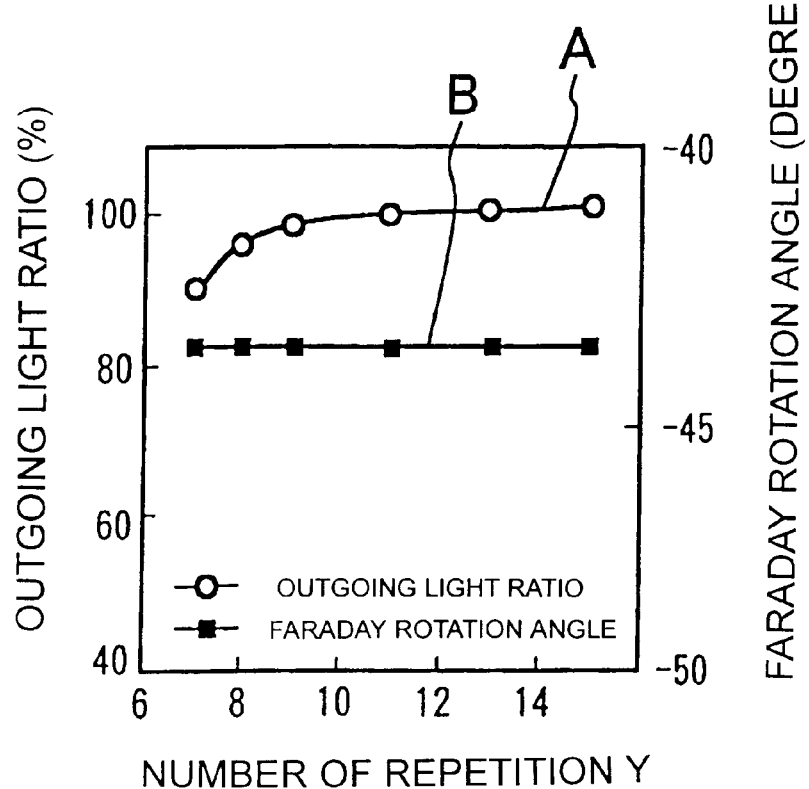
FIG. 7 is a diagram showing an influence of the number of repetition Y on magneto-optical characteristics in the Faraday rotator manufactured by the steps according to the second embodiment.
Figure 8:
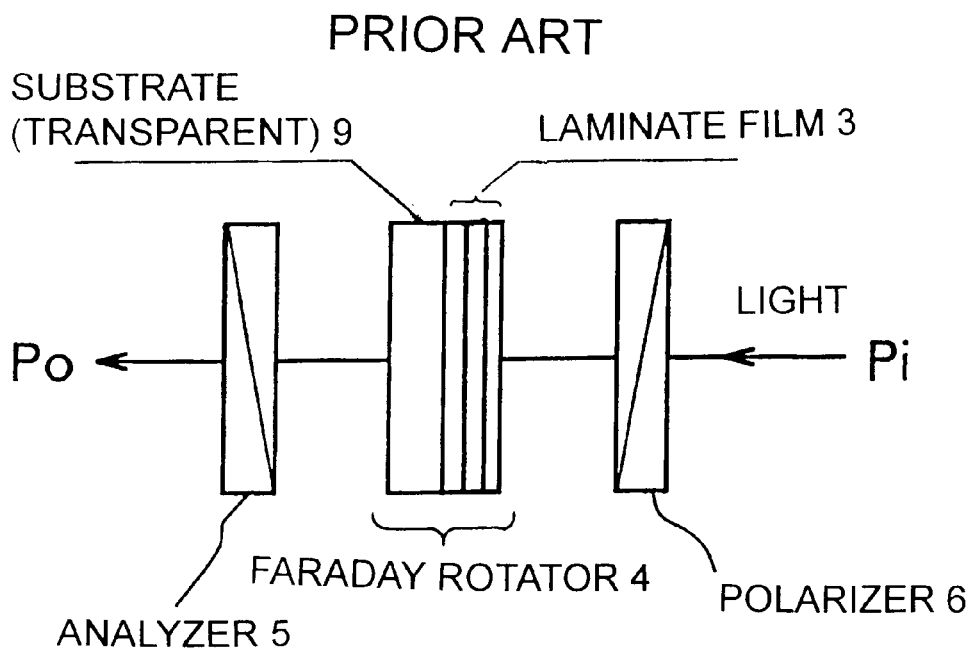
FIG. 8 is a structural diagram of a conventional optical isolator.
Figure 9:
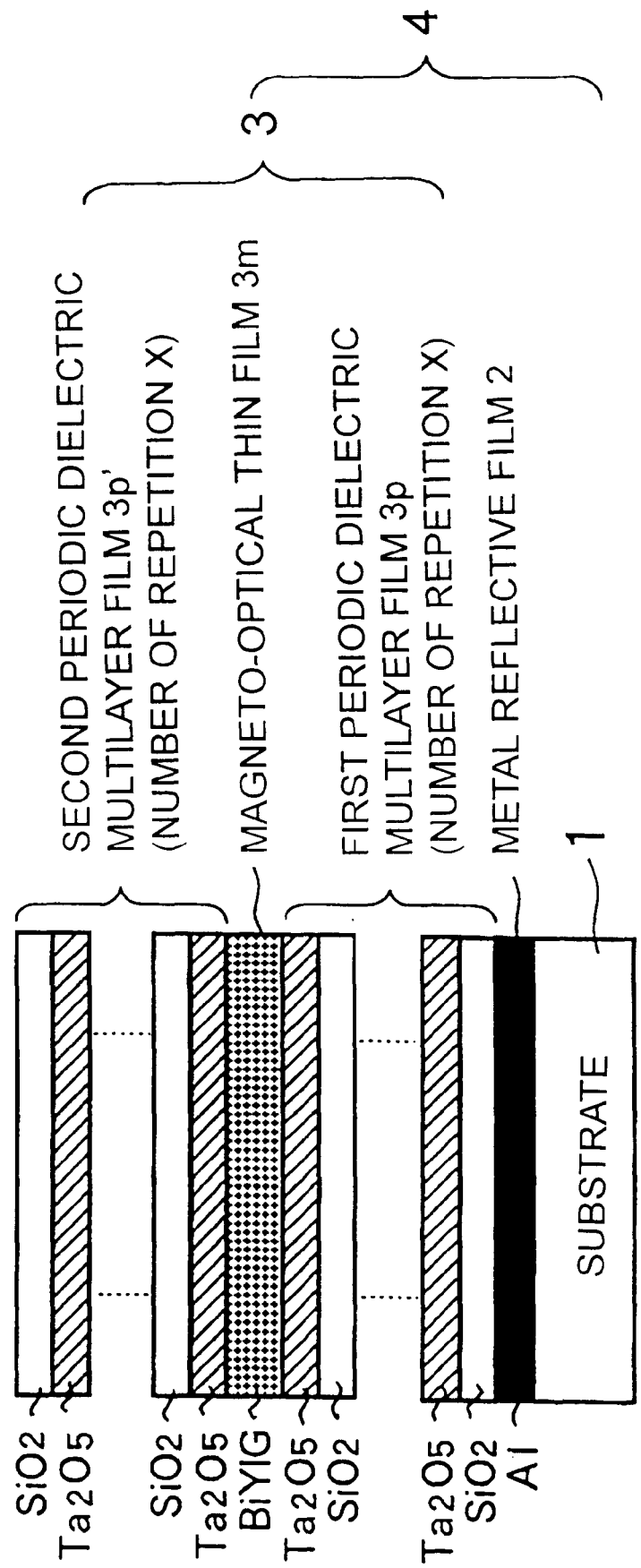
FIG. 9 is a diagram of a film structure for explaining a Faraday rotator with a reflection structure of related art.

In FIG. 7, the magneto-optical characteristics are shown which are obtained when the number Y is changed from 7 to 15 with the number X fixedly set to 7. The left vertical axis indicates an outgoing light ratio A, the right vertical axis indicates a Faraday rotation angle B, and the horizontal axis indicates a number Y. As shown in FIG. 7, while the Faraday rotation angle B is approximately constant (−46 degrees) independent of the number Y, the outgoing light ratio A increases with an increase of Y, and an outgoing light ratio of approximately 100% is obtained when Y is 11 or more. In this case, the total number of layers including BiYIG and Al is 39, which is equal to 45% of 85 layers in the S.B.P structure of the conventional example.

In the first and second embodiments, the Faraday rotator is structured such that light is made incident on a side thereof opposite to a side with the substrate. However, it may be structured such that light is made incident on the side with the substrate. In this structure, the process of the film deposition must be reversed, and the substrate must be transparent and provided with a non-reflective coating film. In this case, the metal reflective film is not disturbed at all with the heat treatment of the magneto-optical thin film. Further, the Faraday rotator with the reflection structure according to the present invention can be produced also by using a magneto-optical thin film for a part or all of the layers of the periodic dielectric multilayer film. In this case, the number of layers can be further reduced and the Faraday rotation angle can be fine adjusted.

According to the first aspect of the present invention, a Faraday rotator is realized which has a reflection structure that enables a significant reduction in the number of layers and which can obtain a necessary Faraday rotation angle without absorption loss of light.

According to the second and third aspects of the present invention, the total number of layers can be reduced to 45% of 85 layers of the S.B.P structure of the conventional example.

What is claimed is:

1. A Faraday rotator, which comprises a first periodic dielectric multilayer film structured such that two kinds of dielectric thin films each having a refractive index different from the other are alternately laminated with regularity in each thickness thereof, a second periodic dielectric multilayer film structured such that two kinds of dielectric thin films each having refractive index different from the other are alternately laminated with regularity in each thickness thereof a magneto-optical thin film and a metal reflective film, and in which the magneto-optical thin film is sandwiched between the first periodic dielectric multilayer film and the second periodic dielectric multilayer film, wherein a number of layers of the first periodic dielectric multilayer film is larger than that of the second periodic dielectric multilayer film, and the metal reflective film is formed on a side of the first periodic dielectric multilayer film opposite to a side in contact with the magneto-optical thin film.

2. A Faraday rotator according to claim 1, wherein the first and second periodic dielectric multilayer films are each structured such that a dielectric thin film of the two kinds, which has a lower refractive index and constitutes the first or second periodic dielectric multilayer film, is in contact with the magneto-optical thin film, and a dielectric thin film with a low refractive index is provided between the metal reflective film and the first periodic dielectric multilayer film.

3. A Faraday rotator according to claim 2, wherein an optical length of the dielectric thin film with a low refractive index is $\lambda/4$ where $\lambda$ is a wavelength of light.

4. A Faraday rotator according to claim 1, wherein at least one of layers constituting the first or second periodic dielectric multilayer film is substituted by a magneto-optical thin film.

* * * * *